INVENTOR
ALBERT W. VINAL
BY Ralph R Barnard
ATTORNEY

Oct. 12, 1965 A. W. VINAL 3,212,068

MAGNETIC MEMORY INSTRUMENTATION

Filed Feb. 27, 1961 6 Sheets-Sheet 4

Oct. 12, 1965 A. W. VINAL 3,212,068

MAGNETIC MEMORY INSTRUMENTATION

Filed Feb. 27, 1961 6 Sheets-Sheet 5

Oct. 12, 1965 A. W. VINAL 3,212,068

MAGNETIC MEMORY INSTRUMENTATION

Filed Feb. 27, 1961 6 Sheets-Sheet 6

United States Patent Office 3,212,068
Patented Oct. 12, 1965

3,212,068
MAGNETIC MEMORY INSTRUMENTATION

Albert W. Vinal, Owego, N.Y., assignor to International Business Machines Corporation, New York, N.Y., a corporation of New York Filed Feb. 27, 1961, Ser. No. 91,961
14 Claims. (Cl. 340—174)

This invention relates to magnetic devices and more particularly to an improved address instrumentation for memories utilizing plural-apertured magnetic memory elements.

Magnetic devices having two stable states are well known in the art and have been the fundamental component in digital, logic, control, memory, and storage systems. Broadly, these electrical devices may be considered in two categories. The first is of the toroidal core destructive type meaning that the stored information state is destroyed during the interrogation of its state. The other is the multi-apertured non-destructive type meaning that its stored information state is not changed when that information state is interrogated. Relay operated switch contacts are another memory element which may be interrogated non-destructively.

When it is desired to use one of these types of magnetic devices in a memory system, one well known way is to use a coincident current addressing technique to reduce the addressing instrumentation. Patent No. 2,736,880 entitled Multicoordinate Digital Information Storage Device by J. W. Forrester, issued February 28, 1956, illustrates the use of the coincident current addressing technique in a memory system using a toroidal core (single path) as the memory element. Similarly, a Patent No. 2,187,115 entitled Switching Device by W. B. Elwood et al, issued January 16, 1940, illustrates the well known coincident current technique when a relay is the memory element. Likewise, an article entitled "Computer Memories" on page 104 of the Proceedings of the IRE, Special Issue on Computers, vol 49, January 1961, describes and illustrates in FIG. 16 the coincident current addressing technique used with a transfluxor (multi-apertured) type memory element.

In each of these publications illustrating the coincident current technique, the memory elements are arranged physically in accordance with rectangular coordinates in rows and columns with two or more address energizing conductors operating with each memory element, along each row and column. For example in the toroidal core type memory array, a single energizing conductor passes through the aperture of each toroidal core arranged in the same column and a single energizing conductor passing through the aperture of each toroidal core arranged in the the same row. Such a memory addressing technique then requires a current source to be connected to each address energizing conductor corresponding to each column and row so that each toroidal core may be coincidentally energizing to selectively address that toroidal core to the exclusion of others.

Similarly, in the relay operated switch type magnetic memory array of Elwood et al., one energizing address conductor passes adjacent the armature of each relay arranged in the same column and another energizing conductor passes adjacent to the element of each relay arranged in the same row. Such an addressing scheme also requires a current source to be connected to each energizing conductor corresponding to each column and row so that each relay operated switch may be coincidentally closed to the exclusion of the others.

Likewise, when the transfluxor type device, having a read and control operation, is arranged for coincident current selection in a memory array, two energizing conductors must pass through each aperture with the read and control apertures of each element arranged in each row and column having the same energizing conductor passing therethrough. Since each memory element has two apertures, the coincident current selection technique requires twice as many addressing conductors as in either the relay operated switch or toroidal core type memory referred to above. This, of course, is one of the significant shortcomings of a coincident current type memory utilizing transfluxor type devices which may in many instances outweigh the non-destructive readout interrogation capability of the transfluxor memory.

The present applicant, in co-pending application Serial No. 39,476, entitled Magnet Devices, filed June 29, 1960, describes an improved transfluxor type device wherein the two apertures in the magnetizable material are of approximately the same inner perimeter. Similar to the transfluxor, one aperture is utilized to provide the read function whereas the other aperture is utilized to provide the control function for changing the information state of the memory element. Unlike the transfluxor, there is described in the above-identified application improvements relating to oppositely biasing the magnetizable material around the control aperture while the read aperture is being operated upon during the reading or interrogation function. This opposite magnetomotive force being applied in the control aperture prevents the reading operation from destroying the stored magnetic information condition being interrogated while at the same time allowing the read addressing currents to be sufficiently large to provide a large signal-to-noise ratio during the readout operation. Similarly, the above-identified application contains the teachings of reverse biasing (reverse magnetomotive force) in the magnetizable material around the read aperture during the control function to prevent the reading operation from adversely switching the flux in the vicinity of the read aperture.

The requirement for biasing the magnetizable material around the control aperture during the reading function and for biasing the magnetizable material around the read aperture during the control function coupled with the need for a technique for instrumenting a coincident current memory array which requires less than two current sources for each row and column of the array provided the motivation for the teachings of the present invention. Accordingly, it is possible to have the advantages of a non-destructive readout when utilizing the two-apertured or transfluxor type memory elements in a coincident current type selection technique without the corresponding disadvantage of a substantial increase of the number of current sources required by the extra aperture which also has to be coincidentally selected.

One additional problem in instrumenting a large magnetic memory operating with a coincident current technique is the inductance of the address conductors. This problem exists without regard for whether the memory element is of the toroidal core, the relay operated switch type, or of the two-apertured magnetic element type. As those skilled in the art know, the transmission line characteristics of a conductor to transmit a current pulse with a minimum time delay is appreciably improved when the current pulse is being transmitted in one direction in a conductor while simultaneously being transmitted in a closely adjacent conductor in the opposite direction. If the addressing conductors can be arranged to conform to this requirement, the transmission line characteristics are improved in that the inductance of the address conductor, as seen by the current source, is reduced and the time required to coincidentally address (selectively) a particular aperture of a particular memory device is substantially decreased. One of the substantial problems of large coincident current memory arrays is the substantial access time required for reading information out of a particular memory element.

It is, therefore, an object of the present invention to provide a new and improved address instrumentation for memories utilizing plural-apertured magnetic memory elements.

It is another object of the present invention to provide a new and improved address instrumentation for memories utilizing plural-apertured magnetic memory elements wherein a minimum of current sources are required.

It is still another object of the present invention to provide a new and improved address instrumentation for memories utilizing plural-apertured magnetic memory elements wherein the transmission line characteristics of the address conductors are improved.

It is an additional object of the present invention to provide a new and improved address instrumentation for memories utilizing plural-apertured magnetic memory elements wherein the address access time to any element or elements of the memory is very short.

Another object of the present invention is to provide a new and improved address instrumentation for memories utilizing plural-apertured magnetic memory elements permitting parallel or shunt characteristic impedance termination.

The objects of the present invention are provided by a new and improved magnetic memory instrumentation wherein the plural memory elements are of the two-apertured type and are arranged according to rectangular coordinates in rows and columns. With one aperture of each pair acting as a read aperture and the other aperture of each pair acting as a control aperture, plural row and column coordinate energizing conductors are passed through each of the apertures. The read apertures of the memory elements in the same row have a common energizing conductor passing therethrough; the control apertures of the memory elements in the same row have a common energizing conductor passing therethrough; and, the read and control apertures of the memory elements in the same column have a common energizing conductor passing therethrough. Finally, each common energizing conductor passing through the read apertures in one row may be electrically connected in series with the common energizing conductor passing through the control apertures of an adjacent row.

The foregoing and other objects, features and advantages of the invention will be apparent from the following more particular description of preferred embodiments of the invention, as illustrated in the accompanying drawings.

Figures 1, 3:
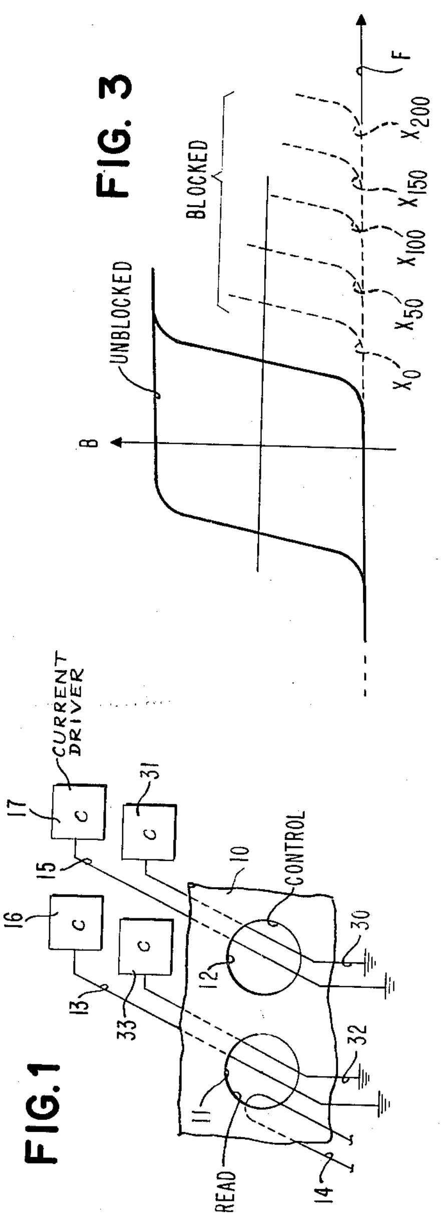
FIG. 1 shows the improved transfluxor type device described in the above-identified co-pending application of the applicant.
FIG. 3 shows a response-excitation characteristic illustrating the advantages of biasing the magnetic material around the control aperture during the reading operation.
Figure 4:
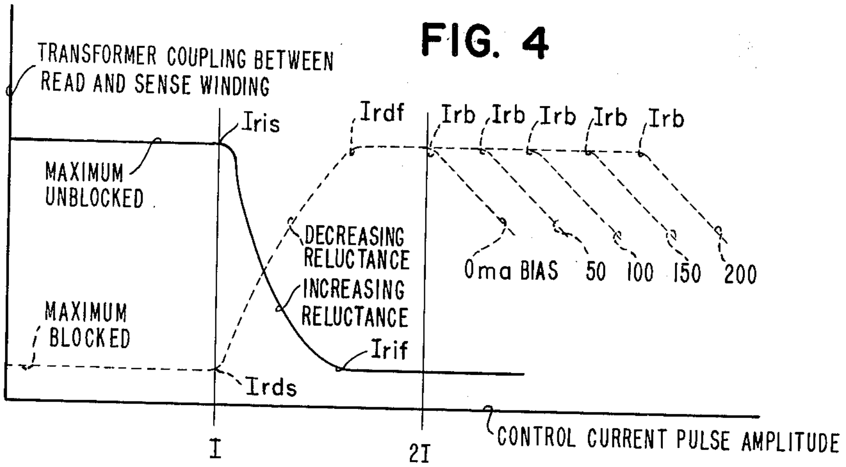
Figure 11:
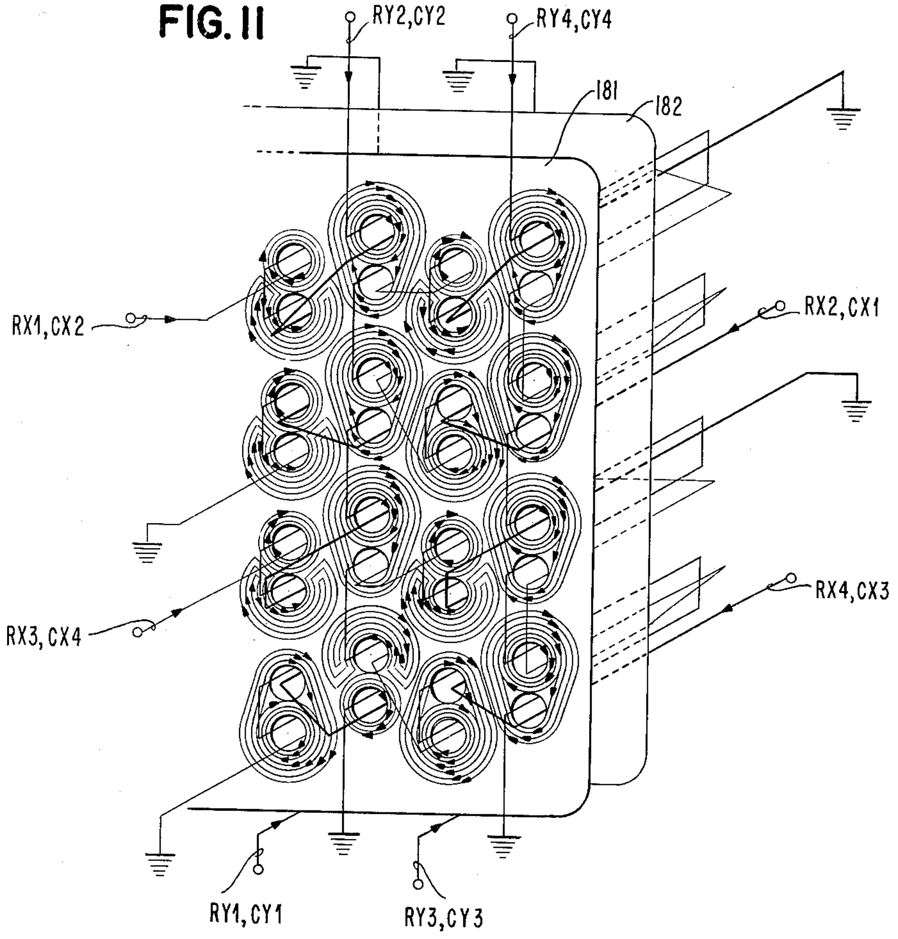
Figures 5, 6:
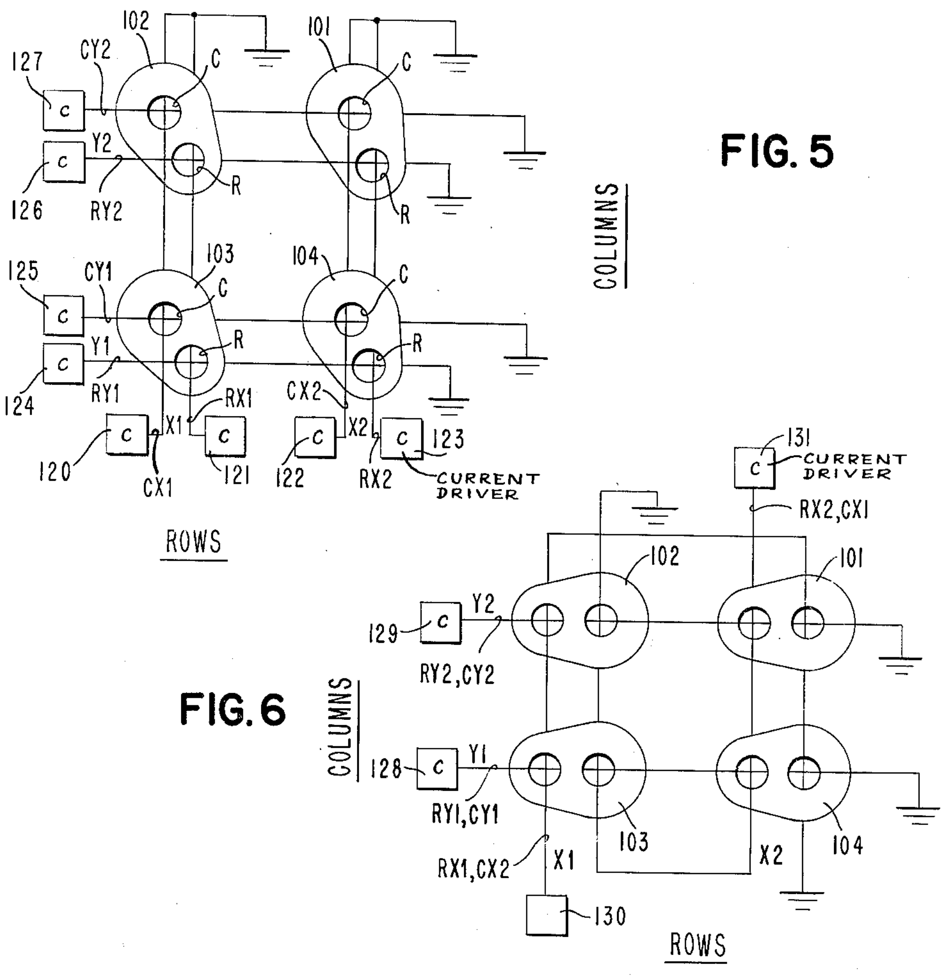
Figure 7:
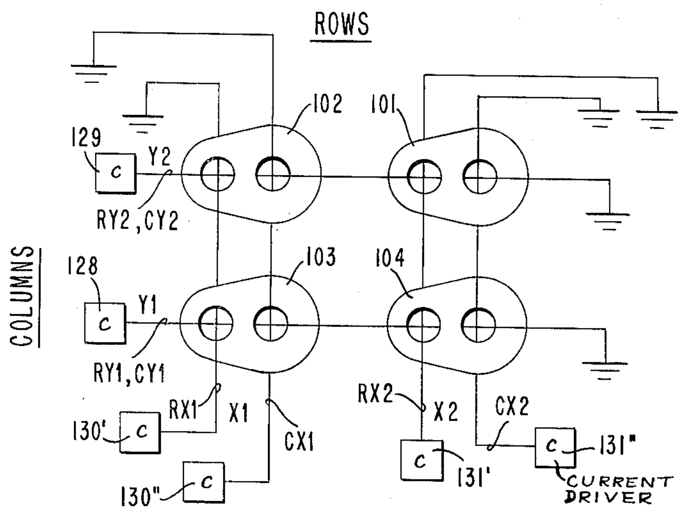
Figure 8:
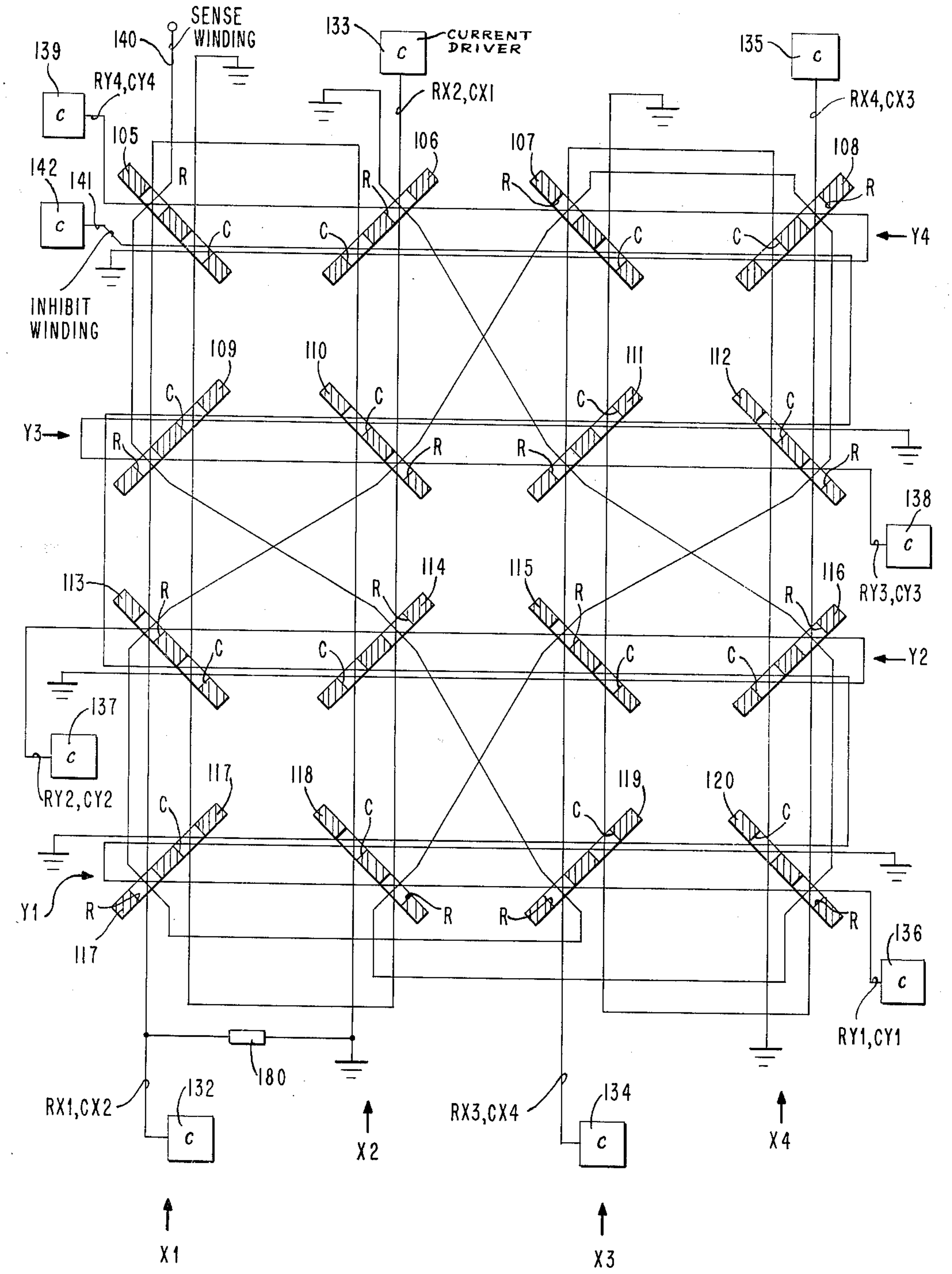
Figure 9:
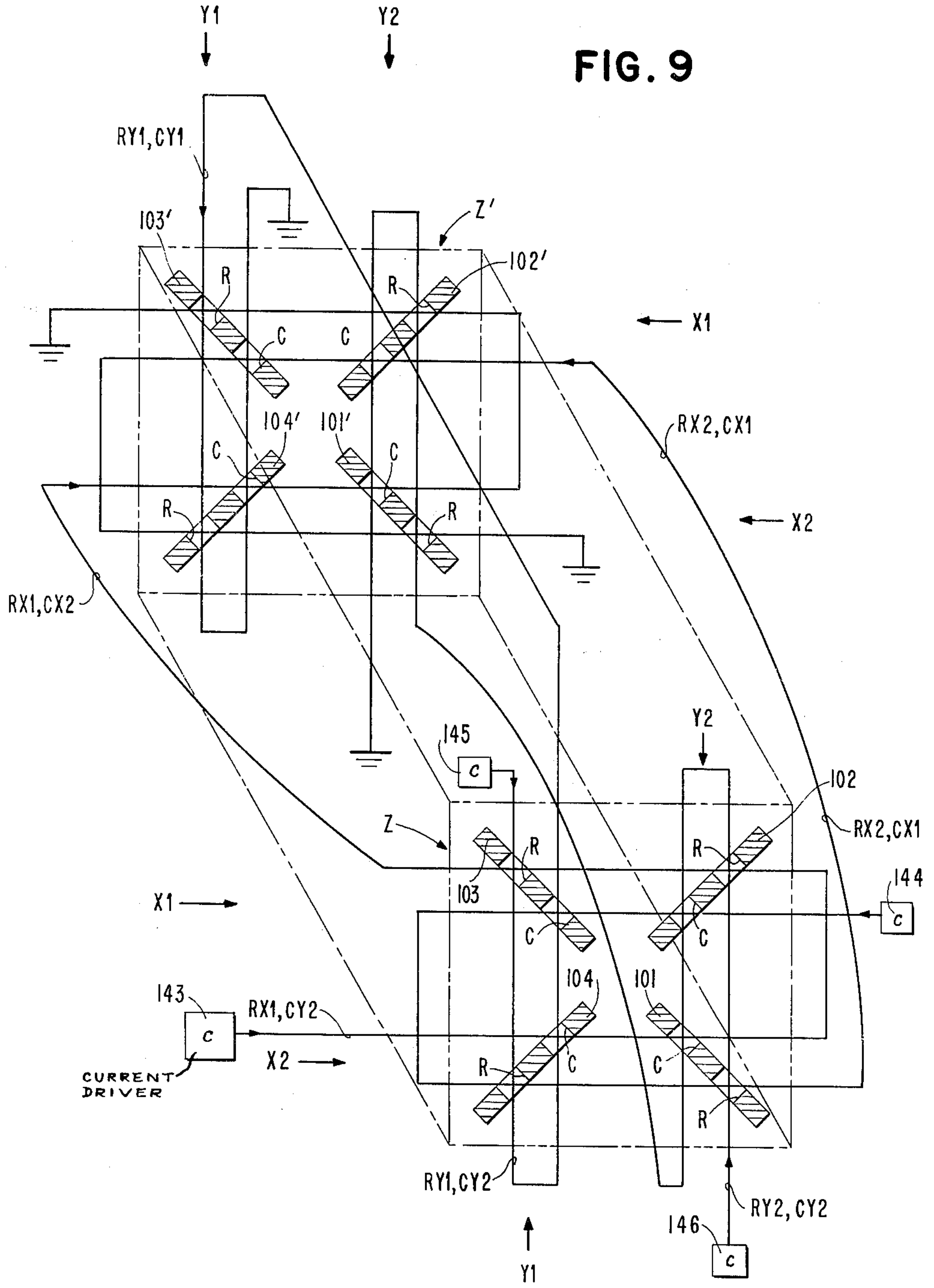
Figure 10:
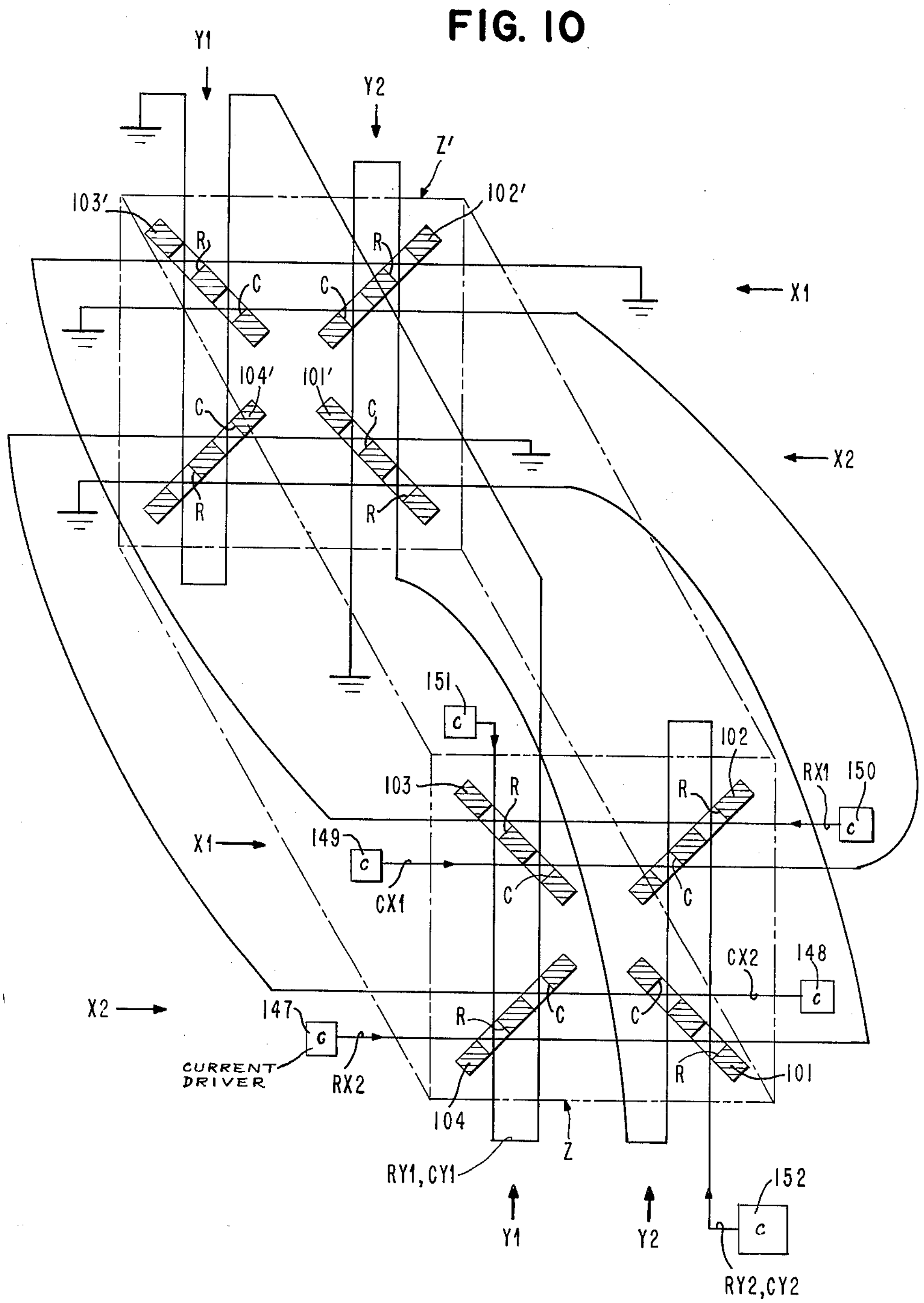

FIG. 4 illustrates a plot of the magnetic coupling between the read and sense windings of FIG. 1 as a function of the magnitude of the current applied through the control windings. For the curve labeled "Increasing Reluctance," the current pulse applied to the control winding is of one polarity. For the curve labeled "Decreasing Reluctance," the current applied to the control windings is of the other polarity;

FIG. 5 shows a coincident current matrix address conductor arrangement for the improved transfluxor device of the above copending application in accordance with the prior art address conductor arrangements requiring two current drivers for each row and column;

FIG. 6 shows the coincident current wiring matrix of FIG. 5 modified in accordance with the teachings of the present invention so as to reduce the current driver requirement by one-half; one current driver is required for each row and column since only two separate address conductors are required for each row and each column;

FIG. 7 shows the coincident current wiring matrix of FIG. 5 modified in accordance with the teachings of the present invention so as to reduce the current driver requirement to three-quarters; two separate address conductors are required for each row and one separate address conductor is required for each column;

FIG. 8 shows the coincident current wiring matrix of FIG. 6 as it applies to a larger matrix and includes both an inhibit and sense winding. Hereinafter, this address conductor arrangement will be referred to as the two-address conductor arrangement for a two-apertured magnetic device memory;

FIG. 9 shows an exemplary application of the two-address conductor arrangement of FIG. 6 and FIG. 8 to a three-dimensional memory array;

FIG. 10 shows the application of the three-address conductor arrangement of FIG. 7 to a three-dimensioned memory array; and FIG. 11 shows the application of the two-address conductor arrangement of FIG. 6 and FIG. 8 to a matrix wherein the memory elements are formed by plural pairs of apertures in a unitary ferrite plate.

Referring to FIG. 1, there is shown the improved transfluxor type device described in the above-identified application of the applicant. In order to present the improved coincident current wiring technique of the present invention, it is essential to understand the operation of the improved transfluxor device of FIG. 1. Therein, two apertures 11 and 12 are shown through an unbounded magnetic material consisting of slab 10. Aperture 11 is designated as the read aperture, while aperture 12 is designated as the control aperture. A read winding 13 is passed through read aperture 11 and a control winding 15 is passed through control aperture 12.

For the purpose of passing alternate bipolar current pulses through read winding 13, a bipolar current driver 16 is shown connected thereto. Similarly, a bipolar current driver 17 is shown connected to control winding 15 for passing alternate bipolar current pulse therethrough. Current drivers 16 and 17 may be of conventional construction.

In order to provide a reverse magnetomotive force bias in the magnetic material around control aperture 12 during the time a bipolar current pulse is being applied to read winding 13 during the reading operation, a bias winding is also passed through that control aperture. The bias winding 30 is connected to a conventional current pulse source 31. As will be more clear hereinafter, the purpose of this reverse bias will be to prevent the magnetomotive force being applied to the magnetic material around the read aperture from destroying the blocked condition when that is the binary state being stored by the memory element.

Passing through read aperture 11 is a bias winding 32 which is connected to a conventional current source 33 for generating a reverse magnetomotive force around the inner wall of the read aperture 11 during the control operation when the memory element is being controlled to change it to its unblocked condition. The advantages of this reverse bias will become more clear hereinafter.

Figure 2:
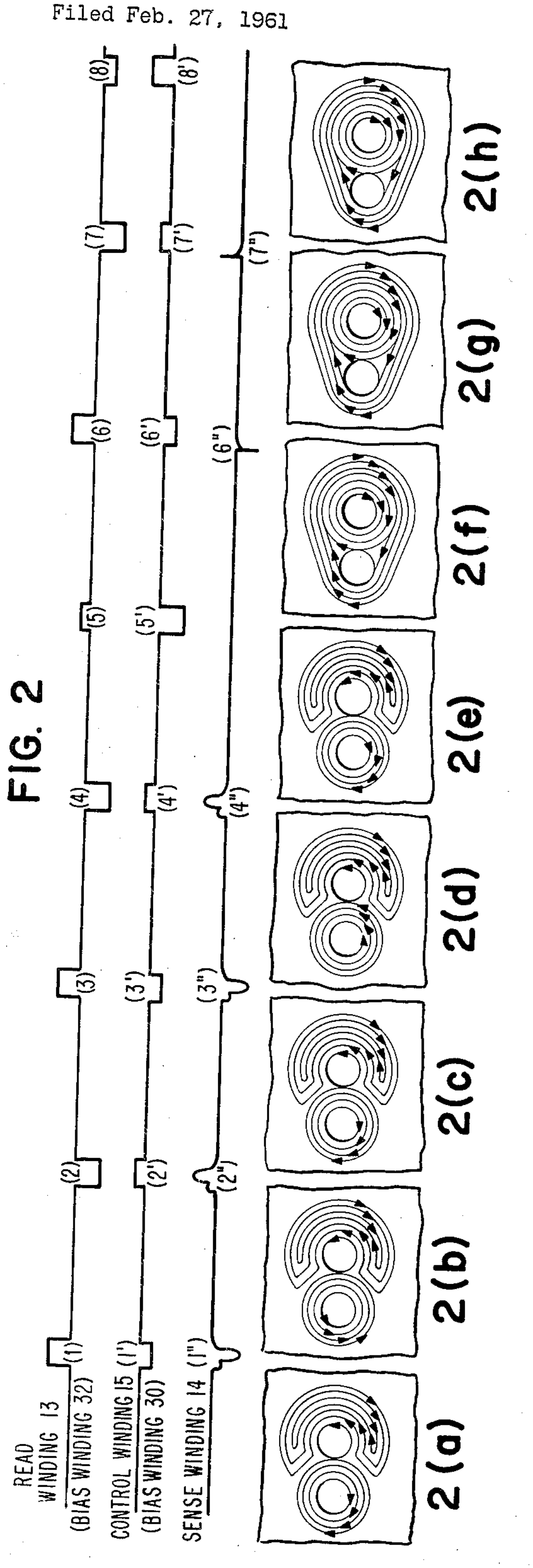
FIG. 2 shows exemplary flux patterns and bipolar current waveforms explaining the operation of the device of FIG. 1 which is pertinent to the teachings of the present invention.

It should be noted that neither a separate control winding 15 and a separate bias winding 30 nor a separate read winding 13 and a separate bias winding 32 are required to provide the bias in either the control and read apertures, respectively. One winding is required in each aperture. FIG. 2 reflects this fact by labeling the current waveforms to show the correspondence.

Referring now to FIG. 2, the remanent flux pattern 2(*a*) shows an exemplary unblocked condition for the magnetic device of FIG. 1. Assuming that the read winding 13 has a current pulse applied thereto by driver 16 having a magnitude and polarity shown by current pulse (1), a counterclockwise flux is generated around read aperture 11 with a remanent condition illustrated by a flux pattern 2(*b*). Because the flux around read aperture 11 has been reversed, a voltage pulse (1″) is induced within sense winding 14 having a polarity which is defined and shown as negative. Note that control winding 15 may have a small current pulse (1′) applied thereto simultaneously with the application of current pulse (1) to read winding 13 without any adverse effect on the unblocked condition of the magnetic device and the amplitude of voltage pulse (1″). Similarly, when a negative current pulse (2) is applied to winding 13 by source 16, the flux around read aperture 11 is reversed with a remanent condition shown in flux pattern 2(*c*). As a result of this reversal of flux, sense winding 14 has a voltage pulse (2″) induced therein having a polarity which is defined and shown as positive. Note, as before, a current pulse (2′) is simultaneously applied to control winding 15 at the same time that current pulse (2) is applied to read winding 13 without adverse effects on the stored condition in the magnetic device.

Next, a positive current pulse (3) applied to read winding 13 acts to reverse the flux around read aperture 11, as shown in flux pattern 2(*d*) and induces a negative voltage pulse (3″) in sense winding 14. Then, a current pulse (4) applied to read winding 13 again reverses the remanent flux around read aperture 11, as shown in flux pattern 2(*e*) so as to derive an induced positive voltage pulse (4″) in sense winding 14. Each time a current pulse is applied through read winding 13, a smaller current pulse is applied to control winding 15 (or bias winding 30) to reverse bias the magnetic material without any adverse effects on the stored magnetic condition.

Accordingly, a transformer action exists between read winding 13 and sense winding 14 representing a stable low reluctance (coercive) condition around read aperture 11. The magnetic flux condition around control aperture 12 plays no part in determining the voltage induced in sense winding because it forms a kidney pattern around the control aperture as shown in flux patterns 2(*a*)–2(*e*). By definition, the existence of this stable unblocked (low reluctance) condition between the read winding 13 and the sense winding 14 passing through read aperture 11 may be considered as representative of a first binary digital state.

In order that the magnetic device of FIG. 1 be switched to its other high reluctance (blocked) condition, a negative current pulse (5′) is applied to control winding 15 so as to generate a clockwise flux around control aperture 12, as shown in flux pattern 2(*f*). As a result of the application of the control magnetomotive force, the flux within the inner leg (magnetic material between the two apertures) is reversed in direction and the flux which previously encircled read aperture 11, only, now encircles both read aperture 11 and control aperture 12. Simultaneously with the application of a magnetic control pulse (5′) to control winding 15, an opposing current (5) is applied to read winding 13 without in any way detracting from the change of the magnetic device from its unblocked to its blocked condition as shown in flux pattern 2(*f*).

It should be noted that the amplitude of the current pulse applied to control winding 15 need only be sufficient to derive a saturation flux, which will extend through the area between the apertures (inner leg) because care was taken to select the polarity of the control current pulse to derive flux having the same direction as the flux in the outer leg around read aperture 11. Since the amplitude of the current pulse applied to the control winding is small, the circular remanent flux pattern around control aperture 12 in combination with the modified flux pattern around aperture 11 appear like a pulley. This modified flux pattern ("pulley pattern") represents the minimum active area of the ferrite slab 10, which is required to represent this stable magnetic reluctance state. By reason of the fact that each leg adjacent read aperture 11 is saturated in the same direction and the fact that the reluctance of the flux path, which now extends around the "pulley pattern," is higher, a current pulse applied to read winding 13, which was previously adequate, will no longer be adequate to reverse the flux around aperture 11, so as to induce a voltage in sense winding 14.

For example, again referring to FIG. 2, if a positive current pulse (6) is applied to read winding 13 when the flux pattern 2(*f*) is present in the magnetic material around apertures 11 and 12, a very small or zero voltage (6″) is induced in read winding 14 as shown because of the aforementioned blocking action. As noted in FIG. 2 the flux pattern 2(*g*) remains the same as flux pattern 2(*f*). If simultaneously, an opposing current pulse (6′) is applied to control winding 15, it will in no way adversely effect the blocked condition of the magnetic device because it is in the same polarity as the current pulse through the same winding that placed the magnetic pulse in the blocked condition. Similarly, if a negative current pulse (7) is applied to read winding 13, a very small voltage (7″) or zero voltage is induced in sense winding 14 and the flux pattern 2(*h*) remains substantially the same as flux patterns 2(*f*) and 2(*g*).

Simultaneously to the application of magnetic current pulse (6) to read winding 13, an opposing current pulse (6′) is applied to control winding 15. As will be made more clear hereinafter, this particular current pulse opposes the tendency of current pulse (6) which was applied to the read winding to destroy the blocked condition of the magnetic device. Without the opposing current pulse applied to control winding 15 under these circumstances, the current pulse (6) would have to be closely controlled in amplitude and be much smaller. As a result of using the control winding to provide an opposing magnetomotive force in the inner wall of control aperture 12 under these circumstances, current pulse (6) may be much larger.

While the aforementioned biasing of the magnetic material around the control aperture 12 is not required during read pulse (7) because its polarity is not such as to destroy the blocked condition, the presence of a bias, shown by current pulse (7′) does not detract from the operation of the device. Current pulses (1) through (8) must as a practical matter be of the same amplitude. Because of the biasing of the inner wall of the control aperture, larger read current pulses may be used and larger voltage signals will be induced in the sense winding on those occasions when the magnetic device is in the unblocked condition. These latter flux patterns are representative of the aforementioned pulley pattern and may be characterized as one binary digital state such as "0".

FIG. 3 shows a response-excitation curve between read and sense windings 13 and 14, respectively, for each of the two stable reluctance coercivity conditions. When the magnetic device of FIG. 1 is in its unblocked condition represented by flux patterns 2(*a*) through 2(*e*) of FIG. 2, the alternate bipolar current pulses applied to read winding 13 successively reverses the flux around the read aperture 11 following a hysteresis loop shown by the solid line of FIG. 3 so as to induce voltages of proper polarity in sense winding 14. However, when the magnetic device of FIG. 1 is placed in its blocked condition, represented by the pattern shown by flux patterns 2(*f*) through 2(*h*), the alternative bipolar current pulses (6) and (7) applied to read winding 13 are insufficient in amplitude to cause the flux around aperture 11 to reverse and follow the flux excitation characteristic shown in FIG. 3 by the dashed line. Note that plural-dashed lines are shown illustrating how the inner wall bias of the control aperture affects the response-excitation curve between read and sense windings 13 and 14 for the blocked condition of the device. This produces no flux change about the read aperture 11 (or very small flux change) no voltage (or a very small voltage) is induced in sense winding 14 by current pulses (6) and (7).

Thus, the magnetomotive force applied by control winding 15 determines whether read winding 13 and sense winding 14 have a transformer-type coupling. When flux patterns 2(*a*) through 2(*e*) are present, the device may be said to be in a one binary state and when flux patterns 2(*f*) through 2(*g*) are present, the device may be said to be in a zero binary state. In order for the device to be returned from flux pattern 2(*h*) to that of 2(*a*), representing the unblocked reluctance condition, a current pulse (8′) having the polarity shown is applied to control winding 15, so as to derive a magnetomotive force and flux to oppose the flux in the center leg of the device between apertures 11 and 12. The amplitude of current pulse (8′) is selected to generate flux in the magnetic material adjacent the control aperture 12 extending to the nearest edge of read aperture 11. At the same time that current pulse (8′) is being applied to control winding 15, a current pulse (8) is being applied to read winding 13 (or bias winding 32) to apply a reverse magnetomotive force to the magnetic material at the inner wall of the read aperture 11. As will be described in more detail hereinafter, this bias will prevent the unblocking current (8′) from adversely reflex switching (kidneying) the flux around the read aperture if the amplitude of that current pulse is not closely regulated.

While FIG. 3 shows the response-excitation characteristic of the magnetic device of FIG. 1 as it appears from the read aperture 11 with respect to the coupling between read and sense windings 13 and 14, respectively, FIG. 4 graphically illustrates the relationship between the presence of the transformer coupling and the amplitude of the control pulse. A solid line is used to illustrate the action of a control current pulse such as (5) of FIG. 2 in driving the magnetic device from the unblocked to the blocked condition representing the transition from maximum to minimum coupling between the read and sense windings 13 and 14. Similarly, a dashed line is used to illustrate the action of a control current pulse such as (8′) of FIG. 2 in driving the magnetic device from the blocked to unblocked condition representing the transition from minimum to maximum coupling between the read and sense windings 13 and 14, respectively.

Referring again to the solid line and assuming the device to be in an unblocked condition, the break point $I_{ris}$ represents the amplitude of the control current pulse (5) at which the magnetomotive force is just sufficient to start blocking the read aperture 11. This break point is determined by the diameter of the control aperture 12, the switching coercivity of the magnetic material, the distance between the read and control apertures 11 and 12, and is relatively independent of the amplitude of the current pulse applied to read winding 13 prior to initiating the blocking control pulse. Similarly, point $I_{rif}$ represents the amplitude of control pulse (5) at which the reluctant increase is completed corresponding to the blocked condition. The amplitude of the current pulse applied to the control winding at which point $I_{rif}$ occurs is determined by the distance between apertures 11 and 12, the diameter of the control aperture 12, and the switching coercivity of the magnetic material. The slope of the solid line adjoining points $I_{ris}$ and $I_{rif}$ is virtually independent of geometrical considerations and depends on the homogeneity of the magnetic material.

Referring again to the dashed line and assuming the device to be in the blocked condition, the break point $I_{rds}$ represents the amplitude of the control current pulse at which the magnetomotive force is just sufficient to start unblocking read aperture 11. It should be noted that the control current pulse applied to the unblocked device is of opposite polarity to that which is used to block the device. Referring to FIG. 2, this control current pulse is represented by pulse (8′). This break point $I_{rds}$ is determined by the diameter of the control aperture 12 and the switching coercivity of the magnetic material and is *independent* of the separation distance between the read and control apertures 11 and 12, respectively. Similarly, the break point $I_{rdf}$ represents the amplitude of the control current pulse (8′) at which the reluctance decrease is completed corresponding to the unblocked condition. The amplitude of current pulse (8′) at which point $I_{rdf}$ occurs is determined by the separation distance between the read and control apertures 11 and 12, the diameter of the control aperture 12, and the switching coercivity of the magnetic material. Moreover, the shape of the transient path of the dashed line between points $I_{rds}$ and $I_{rdf}$ is a function of the diameter of the control aperture, and the separation distance of the apertures. Specifically, the slope of the transient path decreases as the separation distance between the read and control apertures increases.

Point $I_{rb}$ represents the reflex break point where the amplitude of the control pulse exceeds that which has been effective to unblock the read aperture 11 by an amount sufficient to supersaturate the magnetic material between the read and control apertures 11 and 12 such as to commence blocking the magnetic material around the read aperture by reason of the reflex switching (kidney pattern) which begins to occur at the remote side of the inner wall of the read aperture 11.

Referring again to FIG. 4 and more particularly to the dashed line representing the transition of the magnetic device from its blocked condition to its unblocked condition as a function of the amplitude of the current pulse applied to control winding 15, another shortcoming is represented by the location of the reflex break point $I_{rb}$ and the location of point $I_{rdf}$. When the magnetic device of FIG. 1 is used in a coincident current matrix, engineering application partial selection may be represented by a resultant current pulse applied to the control winding having an amplitude which does not exceed either point $I_{rds}$ or $I_{ris}$. Yet when it is desired to fully select the magnetic device exemplified by FIG. 1, the current pulse of proper polarity being applied to control winding 15 must have a resultant amplitude which exceeds points $I_{rds}$, $I_{rdf}$, $I_{ris}$ and $I_{rif}$ and yet not exceed the point $I_{rb}$. Since coincident current selection techniques often depend upon the partial selection corresponding to a current amplitude I and full selection on an amplitude corresponding to 2I, the locations of points $I_{rdf}$, $I_{rif}$ and $I_{rb}$ are critical. In summary, the amplitude of the control current pulse corresponding to 2I must exceed points $I_{rdf}$ and $I_{rif}$ and yet not exceed point $I_{rb}$.

Referring again to FIG. 4, it should be noted that points $I_{rdf}$ and $I_{rb}$ are relatively close together and any resultant current amplitude applied to the control winding 15 which is sufficient to exceed $I_{rdf}$ and $I_{rif}$ could well exceed the point $I_{rb}$ unless extreme care it taken to regulate the amplitude of the resultant control current pulse. The close amplitude regulation of the current pulses applied to control winding 15 would, of course, require a substantial number of electronic components.

During the controlling operation, the reflex break point $I_{rb}$ of FIG. 4 may be moved to the right by appropriately applying a biasing current to the biasing winding 32 for the purpose of inner wall biasing read aperture 11. This is shown by the family of dotted curves in FIG. 4. Thus, during the control operation, current source 33 is used to apply a current through biasing winding 32 which generates a magnetomotive force around the inner wall of read aperture 11 in a direction opposing the folding or reflex switching of the flux at the remote edge of the read aperture. This magnetomotive force tends to aid in the preservation of the unblocked condition of the magnetic device exemplified by the flux pattern 2(*a*) of FIG. 2 and increase the amplitude of the current pulse ($I_{rb}$) applied to the control winding 15 which would be sufficient to destroy the unblocked condition by an amount essentially equal to the inner wall bias applied to the read aperture. The greater the amplitude of the biasing applied to the biasing winding 32, the greater the amplitude of the current pulse applied to the control winding 15 can be prior to exceeding the reflex break point $I_{rb}$. In summary, the greater the biasing of the magnetic material around the inner wall of the read aperture, the more the point $I_{rb}$ moves to the right in FIG. 4. The amplitude of this bias, however, should not exceed the inner wall switching threshold of the aperture biased. Several exemplary curves are shown in FIG. 4 to illustrate this feature.

Thus, biasing the magnetic material around the inner wall of the read aperture during the control operation moves the reflex break point $I_{rb}$ out to the right on FIG. 4 so that the resultant amplitude of the current pulse applied to the control winding need not be controlled with great accuracy to assure that it exceeds the amplitude corresponding to both the points $I_{rdf}$ and $I_{rif}$ and yet not exceed point $I_{rb}$. More specifically, the separation distance between the read and control apertures 11 and 12, the switching coercivity of the magnetic material and/or the diameter of the control aperture may be selected so that substantially equal amplitudes of the current pulse passing through the control winding 15 will exceed the points $I_{rdf}$ and $I_{rif}$ and yet not be greater than twice the amplitude of current passing through the control winding corresponding to the points $I_{ris}$ and $I_{rds}$. If this latter requirement were not met, the magnetic device of FIG. 1 would not work properly as an element in a coincident current selection matrix. Besides the amplitude of the bipolar current pulses applied to the control winding for performing the control function may be of the same magnitude.

During the reading operation of the magnetic device of FIG. 1, the destructibility threshold point $X_0$ of FIG. 3 may also be moved to the right by appropriately applying a biasing current to the biasing winding 30. This is shown by the family of dotted curves in FIG. 3. The current source 31 applies a current through biasing winding 30 which generates a magnetomotive force around the inner wall of the control aperture 12 in a direction opposing the folding or reflex switching of the flux at the remote edge. This magnetomotive force tends to aid in the preservation of the blocked condition of the magnetic device (exemplified by the flux pattern 2(*g*)) and increases the amplitude of the current pulse required to be applied to the read winding 13 which would be sufficient to destroy the blocked condition. This bias referred to as inner wall bias increases the read destructibility threshold by an amount essentially equal to the bias amplitude. The greater the amplitude of the biasing current applied to biasing winding 30, the greater the amplitude of the current pulse applied to the read winding 13 has to be to exceed the destructibility threshold point ($X_0$–$X_{200}$). In FIG. 3, points $X_0$, $X_{50}$, $X_{100}$, $X_{150}$ and $X_{200}$ represent the modification of the destructibility threshold by the application 0, 50, 100, 150 and 200 milliamperes of inner wall bias to bias winding 30. In this exemplary embodiment of the present invention, 200 milliamperes represent the bias level which by itself will produce irreversible switching within the magnetic material of the inner wall. This bias level is often referred to as the inner wall switching threshold. In practicing the teachings of the present invention, this inner wall bias should not exceed the inner wall switching threshold. This inner wall bias control in the destructibility threshold is essentially linear and unity until it reaches the inner wall switching threshold. Within reasonable limits, the biasing of the magnetic material around control aperture 12 has no effect on the characteristic of FIG. 3 when the magnetic device is in the unblocked condition because the flux being switched around read aperture 11 does not also encircle the control aperture 12 during the unblocked condition and the inner wall biasing does not actually switch flux. (Note that during the blocked condition, the flux around read aperture 11 also encircles the control aperture 12.) Thus, by following the teachings of the above-identified co-pending application of the applicant, the amplitude of the alternative bipolar current pulses being applied to read winding 13 by current source 16 may be made greater by an amount equal to the inner wall bias, without exceeding the destructibility threshold represented by point X and the output signal induced in sense winding 14 will be greater and more usable.

As a result, there is substantial improvement in the "one/zero" signal which may be obtained during the nondestructive interrogation of the binary digital state being stored in the magnetic storage device. Moreover, because the amplitude of the alternate bipolar current pulses being applied to the read winding 13 may be increased, the time required to interrogate the device (access time) is decreased.

As one skilled in the art will recognize from the above discussion, the selection and control of the destructibility threshold point X and points $I_{ris}$, $I_{rif}$, $I_{rds}$, $I_{rdf}$ and $I_{rb}$ represent significant design parameters which can be a determining factor in the construction of an improved magnetic device having two magnetic reluctance (coercive) conditions wherein each stable state may be interrogated without changing that state. Mechanical techniques alone, without the use of inner wall bias in either the read or control aperture (or both), according to the teachings of the present invention, do not provide adequate design parameters for an adequate magnetic storage device of the type described. Furthermore, the magnetic device as described can be constructed to be readily usable in a coincident current selection matrix application exemplified by the binary digital memory.

While FIG. 1 shows a single read winding 13, it should be clear that plural windings may be used in its place for generating a resultant magnetomotive force as required by the particular engineering application. The coincident current memory matrix of FIGS. 5–11 are examples of such an exemplary application.

In summary, the foregoing describes the benefits of using an inner wall bias in either the control or read apertures during the writing (control) or reading operation, respectively. It increases the signal level in the sense winding when the device is in the unblocked state, decreases the need for close control of the amplitude of addressing current pulses, and is an aid in the design of a memory matrix utilizing the multi-aperture magnetic device as a memory element.

Referring to FIG. 5, there is shown plural magnetic devices arranged in a matrix for coincident current selection in accordance with FIG. 16 of the above-identified article in the Proceedings of the IRE. Sense windings or inhibit windings are not shown for purposes of simplicity of presentation even though they would be required in a practical application operating in a manner well known to those skilled in the art. Although only four magnetic devices are shown, it is, of course, obvious that many more elements could be included in the matrix. Magnetic elements may be identified by the X coordinate (row) and the Y coordinate (column) as shown. For example, magnetic device 103 is located in row X1 and column Y1 and magnetic device 101 is located in row X2 and column Y2.

For proper operation in a coincident current matrix of a magnetic device as described hereinabove, each aperture must have two energizing conductors passing therethrough; one identified by its row and the other identified by its column. For example, conductor CX1 corresponding to row X1 passes through the control aperture of both magnetic devices 102 and 103. A conventional bipolar current source 120 is connected with one terminal and the other terminal is grounded. Conductor RX1 corresponding to row X1 passes through the read aperture of both magnetic devices 102 and 103. A conventional bipolar current source 121 is connected with one terminal and the other terminal is grounded.

Similarly, conductor CX2 corresponding to row X2 passes through the control aperture of both magnetic devices 101 and 104. A conventional bipolar current source 122 is connected with one terminal and the other terminal is grounded. Likewise, conductor RX2 corresponding to X2 passes through the read aperture of both magnetic devices 101 and 104. A conventional bipolar current source 123 is connected with one terminal and the other terminal is grounded.

In order to make a selection with respect to the Y coordinate according to column Y1, conductor RY1 passes through the read aperture of both magnetic devices 103 and 104. One end of conductor RY1 is grounded and the other is connected to a bipolar current source 124. Conductor CY1 corresponding to column Y1 passes through the control aperture of both magnetic devices 103 and 104. A bipolar current source 125 is connected with one terminal and the other terminal is grounded.

Similarly, conductor RY2 corresponding to column Y2 passes through the read aperture of magnetic devices 102 and 101. A bipolar current source 126 is connected with one terminal and the other terminal is grounded. Likewise, conductor CY2 corresponding to column Y2 passes through the control aperture of magnetic devices 102 and 101. A bipolar current source 127 is connected to one terminal and the other terminal is grounded.

Thus, each of the apertures of each of the magnetic devices may be coincidentally addressed for either a reading or controlling operation. Following the teachings of the above-identified co-pending application of the applicant and assuming that it is desired to read a stored condition in magnetic device 102, both conductors RX1 and RY1 will be appropriately energized by the current source and at the same time bias would be provided to the magnetic material around that control aperture of that magnetic device by either conductor CX1 or conductor CY2. Accordingly, during the reading operation, the coincidentally selected magnetic device would be having three sources of magnetomotive force applied thereto, two for coincidentally reading and the other for reverse biasing the control aperture.

Conversely, it may be desired to control (write in) magnetic device 102 so that both conductor CY2 and conductor CX1 would be coincidentally energized. If a reverse bias is to be applied to the magnetic material around the read aperture during the control operation in accordance with the teachings of the above-identified co-pending application of the applicant, either conductor RY2 or conductor RX1 may be appropriately energized by current source 121. Any of the other magnetic devices of the matrix may be selected for reading or controlling in the same manner.

While the non-destructive features of a memory matrix, such as that shown in FIG. 5, have considerable advantage, this advantage may well be outweighed by the substantially large requirement of two drivers for each column or row. In order to overcome this shortcoming, the teachings of the present invention include the alteration of the address conductor in keeping with the requirement for biasing either the read or control aperture during the control or read functions respectively.

For example, referring to FIG. 6, there is only one address conductor for each column Y1 and Y2 even though the matrix contains the same number of two-apertured magnetic devices and the same operational characteristics. Specifically, a single address conductor RY1, CY1 passes through both the read and control apertures of magnetic device 103 and the read and control apertures of magnetic device 104, both located in column Y1. Since this address conductor passes through the read and control apertures of the same magnetic device in opposite directions, a half-address current pulse applied to one aperture may act as a reverse bias with respect to the other aperture. Conductor RY1, CY1 is connected to a bipolar current source 128 at one terminal and grounded at the other terminal. Similarly, a single address conductor RY2, CY1 passes through the read and control apertures of magnetic device 102 in different directions and then through the read and control apertures of magnetic device 101 in different directions. Conductor RY2, CY2 is connected to be energized by bipolar current source 129 at one extremity and is grounded at the other extremity.

Along the other coordinate, a conductor RX1, CX2 energized by bipolar current source 130 passes through the read aperture of magnetic devices 103 and 102 (row X1) in one direction and then through the control aperture of magnetic devices 101 and 104 (row X2) in the other direction. One extremity of conductor RX1, CX2 is grounded as shown. Similarly, conductor RX2, CX1 is energized by conventional bipolar current 131 and passes through the read aperture of magnetic devices 101 and 104 (row X2) in one direction and then through the control aperture of magnetic devices 103 and 102 (row X1) in the other direction. Conductor RX2, CX1 is grounded as shown.

In summary, each of the apertures have the addressing conductors passing therethrough in the same direction, even though the read and control apertures have the addressing conductors passing therethrough in opposite directions. Moreover, considering a reading operation of magnetic device 102, a current pulse will be applied coincidentally to each of conductors RX1, CX2 and RY2, CY2 which in total will be sufficient to reverse the flux around the read aperture of magnetic device 102. Simultaneously, conductor RY2, CY2 will act as a biasing source for the control aperture. Also simultaneously, the read aperture of magnetic device 103 and the control aperture of magnetic device 104 will be receiving a magnetomotive force which is of half-address magnitude. It is to be especially noted that although the control aperture is simultaneously receiving a magnetomotive force from both conductor RY2, CY2 and conductor RX1, CX2, these magnetomotive forces are opposing and canceling one another. Therefore, magnetic device 102 is coincidentally selected from a matrix and performs a reading operation in combination with an inner wall bias in the magnetic material around the control aperture in the manner described by the teachings of the above-identified co-pending application. The selection and the reading operation of any of the other magnetic devices of the matrix of FIG. 6 operates in substantially the same manner.

If magnetic device 102 is to be selected for a control operation, conductor RY2, CY2 may be energized at the same time that conductor RX2, CX1 is energized. It should be noted that these two conductors pass through the control aperture of magnetic device 102 in the same direction, while conductor RY2, CY2 passes through the read aperture of magnetic device 102 in the opposite direction so as to provide the necessary biasing during the control operation. When magnetic device 102 is coincidentally selected for a control operation, the magnetic material around the control aperture of the magnetic device 103 and the magnetic material around the read aperture of magnetic device 104 will receive a magnetomotive force commensurate with a half-address via conductor RX2, CX1. At the same time, a magnetomotive force is being applied to the magnetic material around the read aperture of magnetic device 101 in one direction by conductor RX2, CX1 and a magnetomotive force is being applied to the magnetic material around the same aperture in the other direction by conductor RY2, CY2. These magnetomotive forces cancel one another.

In summary, because of the capability of the magnetic devices 101 through 104 to utilize reverse biasing in the remote aperture of the device being coincidentally selected, the current driver requirement for the matrix may be materially decreased by proper arrangement of the addessing conductors. Specifically, by properly arranging the addressing conductors, the number of drivers required for the rectangular matrix of magnetic devices having two apertures is the same as the number of drivers required for a toroidal core (single path) type memory device or a coincident current rectangular matrix of relays as described in the above-identified Elwood et al. patent.

In addition to the reduction of the current driver requirement by use of the arrangement of address conductors described in FIG. 6, other advantages accrue when the address conductors are arranged so that two conductors closely adjacent to one another have impressed therein current pulses going in opposite directions. For example, the current pulses applied to conductor RX1, CX2 pass through the read apertures of devices 103 and 102 and then return in relative close proximity in an opposing direction through the control apertures of devices 101 and 104 to ground. As those skilled in the art will recognize, such a condition improves the transmission line qualities of the conductor in that the effective transmission line inductance is reduced.

If it is not desired to obtain the total current driver reduction afforded by the address conductor arrangement of FIG. 6, the address conductor arrangement of FIG. 7 represents a modification hereinafter generally referred to as the three-address conductor arrangement. As before, the exemplary rectangular coordinate matrix is made of four magnetic devices 101, 102, 103 and 104 arranged in rows X1 and X2 and columns Y1 and Y2. As in the case of FIG. 6, current driver 128 is connected to an address conductor RY1, CY1 which in turn passes through the read aperture of magnetic device 103 in one direction and its control aperture in the other direction and on through the read and control apertures of magnetic device 104 in the same manner to ground. Similarly, current driver 129 is connected to an address conductor RY1, CY1 which in turn passes through the read aperture of magnetic device 102 in one direction and its control aperture in the other direction and on through the read and control apertures of magnetic device 101 in the same manner to ground.

With respect to row X1, two bipolar current sources and two separate address conductors are utilized for the read and control apertures. Specifically, current source 130′ energizes address conductor RX1 which in turn passes through the read apertures of magnetic devices 103 and 102 in the same direction to ground. Current source 130″ energizes address conductor CX1 which in turn passes through the control apertures of magnetic devices 103 and 102 in the same direction to ground but in a direction opposite to that of the address conductor RX1.

In like manner, magnetic devices in row X2 have separate address conductors and drivers for the read and control apertures. Current source 131′ energizes address conductor RX2 which in turn passes through the read apertures of magnetic devices 104 and 101 in the same direction to ground. Current source 131″ energizes address conductor CX2 which in turn passes through the read apertures of magnetic devices 104 and 101 in the same direction to ground and in opposite direction to address conductor RX2. By inspection, it may be noted that the reduction in the number of current sources of the FIG. 7 arrangement is only half that of FIG. 6.

Assuming a reading operation is being performed on magnetic device 102, address conductors RY2, CY2 and RX1 are coincidentally energized. The magnetic material around the read aperture of the device 102 receives sufficient magnetomotive force to provide a signal in a sense winding (not shown) if the device is in its unblocked condition. At the same time, address conductor RY2, CY2 provides a reverse bias magnetomotive force to magnetic material at the inner wall of the control aperture of device 102 to provide the inner wall reverse biasing described hereinabove. Address conductor RX1 applies a half-address magnetomotive force to the read aperture of device 103 which is insufficient to produce a readout signal. Magnetic device 104 receives no magnetomotive force at all since none of the energized conductors pass therethrough.

Both the magnetic material around the read aperture and the magnetic material of the control aperture of device 101 receive magnetomotive force from the current pulse passing through conductor RY2, CY2 but this magnetomotive force is insufficient to change either the stored condition therein or produce a readout signal therefrom.

FIGS. 5, 6 and 7 show only four magnetic devices in a rectangular coordinate matrix without the showing of either the sense winding or inhibit winding necessary for proper operation in order that the rudiments of the teachings of the present invention as distinguished from the prior art shown by FIG. 5 may be present in the simplest form. FIG. 8 shows the two-address conductor arrangement of FIG. 6 applied to a larger rectangular coordinate matrix comprising 16 magnetic devices 105–120. These devices are arranged in four columns Y1, Y2, Y3 and Y4 and four rows X1, X2, X3 and X4. According to the teachings of the present invention, there is one current driver for each row and each column even though each magnetic device has both a read and control aperture.

Specifically, in row X1, bipolar current driver 132 energizes an address conductor RX1, CX1. This conductor passes through the read apertures of magnetic devices 117, 113, 109 and 105, each in the same direction, and then back through the control apertures of magnetic devices 106, 110, 114 and 118 located in row X2, each in the same direction, but in a direction opposite to the way the same conductor passes through the read apertures of devices in row X1. The extremity of conductor RX1, CX2 remote from current driver 132 is grounded as shown.

In row X2, bipolar current driver 133 energizes address conductor RX2, CX1. This conductor passes through the read apertures of magnetic devices 106, 110, 114 and 118, each in the same direction, and then back through the control apertures of magnetic devices 117, 113, 109 and 105 in row X1, each in the same direction, but in a direction opposite to the way the same conductor passes through the read apertures of devices in row X2. The extremity of conductor RX2, CX1 remote from current driver 133 is grounded as shown.

Similarly, in row X3, bipolar current driver 134 energizes address conductor RX3, CX4. This conductor passes through the read apertures of magnetic devices 119, 115, 111 and 107, each in the same direction, and then back through the control apertures of magnetic devices 108, 112, 116 and 120 in row X4, each in the same direction, but in a direction opposite to the way the same conductor passes through the read apertures of devices in row X3. The extremity of conductor RX3, CX4 remote from current driver 134 is grounded as shown.

In like manner, in row X4, bipolar current driver 135 energizes address conductor RX4, CX3. This conductor passes through the read apertures of magnetic devices 108, 112, 116 and 120, each in the same direction, and then back through the control apertures of magnetic devices 119, 115, 111 and 107 in rows X3, each in the same direction, but in a direction opposite to the way the same conductor passes through the read apertures of devices in row X4. The extremity of conductor RX4, CX3 remote from current driver 135 is grounded as shown.

Along the Y coordinate in column Y1, bipolar current driver 136 energizes address conductor RY1, CY1. That conductor then passes through the read apertures of devices 120, 119, 118 and 117, each in one direction, and back through the control apertures of the same devices. Note that address conductor RY1, CY1 passes through the control apertures of the devices in column Y1, each in the same direction, but in a direction opposite to its passage to the read apertures of the same devices. Whereas in FIG. 6, it was not as clear that the transmission characteristics of address conductor RY1, CY1 was improved by its folding back in close proximity, this becomes more apparent in the larger array of FIG. 8. The extremity of address conductor RY1, CY1 remote from bipolar current source 136 is grounded as shown.

In column Y2, bipolar address current driver 137 energizes address conductor RY2, CY2. That conductor then passes through the read apertures of devices 113, 114, 115 and 116 in one direction and back through the control apertures of the same devices. Address conductor RY2, CY2 passes through the control apertures of the devices in column Y2, each in the same direction, but in a direction opposite to its passage to the read apertures of the same devices. The extremity of address conductor RY2, CY2 remote from bipolar current source 137 is grounded as shown.

Similarly, in column Y3, bipolar address current driver energizes address conductor RY3, CY3. That conductor then passes through the read apertures of devices 112, 111, 110 and 109, each in one direction, and back through the control apertures of the same devices. Address conductor RY3, CY3 passes through the control apertures of the device in column Y3, each in the same direction, in a direction opposite to its passage to the read aperture of the same devices. The extremity of address conductor RY3, CY3 remote from bipolar current source 138 is grounded as shown.

In like manner, in column Y4, bipolar address current driver 139 energizes address conductor RY4, CY4. That conductor then passes through the read apertures of devices 105, 106, 107 and 108 in one direction and back through the control apertures of the same devices. Address conductor RY4, CY4 passes through the control apertures of the devices in column Y4, each in the same direction, in a direction opposite to its passage to the read apertures of the same devices. The extremity of address conductor RY4, CY4 remote from bipolar current source 139 is grounded as shown.

For the purpose of simplicity of the presentation, the use of a characteristic impedance in each of the address conductors has not been shown generally in the figures. However, to illustrate one of the advantages of the present invention, resistor 180 is shown connecting the current source 132 of row X1 with ground. Since the remote end of conductor RX1, CX2 is also grounded at the same point, the characteristic impedance is in parallel with the address conductor rather than in series as was the case of the prior art. This is possible because the source end and the remote end of each address conductor are in close physical proximity.

As shown in FIG. 1, the read aperture of each magnetic device requires a sense winding to perform the readout operation when that magnetic device is coincidentally selected or addressed for reading. This requirement is substantially the same as the toroidal core device. Therefore, the same sensing technique can be utilized for operating the improved transfluxor device as described hereinabove in a coincident current memory matrix as was used in similar coincident current memory matrices made up of toroidal cores. For example, in a given plane, represented by the array of FIG. 8, one sense winding may be utilized to thread the read apertures of all of the devices in that plane since only one device will be coincidentally addressed for reading at any one time. Specifically, sense winding 140 passes through the read aperture of devices 105, 109, 114 and 119 in a first direction; then through the read apertures of devices 117, 113, 110 and 107 in the second direction; then through the read apertures of devices 120, 116, 111 and 106 in the second direction, prior to being terminated. It should be noted that the sense winding passes through the read apertures of half the devices of the memory plane of FIG. 8 in a first direction and the other half in a second direction. As those skilled in the art will recognize, this is the conventional technique for obtaining noise cancellation due to the proximity of address conductors and the effect of half-read address current pulses on known selected magnetic devices.

Since the teachings of the present invention are applicable to coincident current matrices of more than one plane (three-dimensional), it may be necessary to inhibit the control (write) operation within a magnetic device located at a fully addressed coordinate in a particular plane. Here again following conventional techniques, an inhibit winding 141 may be passed through the control apertures of all the magnetic devices in a particular plane such as that shown in FIG. 8 by devices 105–120. As shown, inhibit winding 141 may be energized at one extremity by a current source 142 and grounded at the other extremity. The directions which the address conductors pass through the read and control apertures of the device of FIG. 8 follow the same pattern as that shown in FIG. 6. Only one read aperture is coincidentally addressed during a read operation and at the same time it receives a reverse biasing magnetomotive force in the magnetizable material around its control aperture. No other devices other than the selected device, have a magnetomotive force applied thereto which is sufficient to either change its storage condition or produce a readout signal in the sense winding 140.

An analysis of both FIG. 6 and FIG. 8 indicates that the teachings of the present invention with respect to the address conductor arrangements may be summarized. For example, to determine with which two rows an address conductor may cooperate, the following equation may be solved:

$$RXN=CX(N+K) \qquad (1)$$

where:

N (the row designation) is an ODD integer
$K$=1, 3, or 5, etc., and
$RXN$=the row in which the conductor threads or passes through the read aperture
$CX(N+K)$=the row in which the same conductor threads the control apertures in an opposite direction $$RXN=CX(N-K)$$

where:

N (the row designation) is an EVEN integer
$K$=1, 3, or 5, etc., and
$RXN$=the row in which the conductor threads or passes through the read aperture
$CX(N-K)$=the row in which the same conductor threads the control apertures in an opposite direction With respect to the columns, the address conductor passes through all of the read apertures of that column in one direction and all of the control apertures of that same column in the opposite direction as expressed in the following equation:

$$RYN=CYN \qquad (2)$$

where: $N$=column designation

In order to illustrate that the teachings of the present invention are applicable to a three-dimensional memory array, the four-device memory array of FIG. 6 is shown in a three-dimensional environment in FIG. 9. Only the first plane Z and the last plane Z' is shown; however, enough of the address wire arrangement is included to illustrate how the teachings of the present invention may be applied. As in FIG. 6, neither the sense winding nor the inhibit winding is shown in order to simplify the illustration of the address conductor arrangement. Primed numbers are used to differentiate between the first plane Z and the last plane Z′.

In row X2, a bipolar current driver 143 energizes address conductor RX1, CX2. Address conductor RX1, CX2 then passes through the control apertures of magnetic devices 104 and 101 in one direction and back through the read apertures of devices 102 and 103 in the other direction. Thereupon, instead of being grounded as in FIG. 6, the address conductor goes to another core plane represented by Z′, where in row X2, it passes through the control apertures 104′ and 101′ in one direction and then back through the read apertures of devices 102′ and 103′ in the opposite direction prior to being grounded. Of course, in the practical embodiment including many planes, this conductor arrangement would be continued for each plane.

In row X1, a bipolar current driver 144 energizes address conductor RX2, CX1. Address conductor RX2, CX1 then passes through the control apertures of magnetic devices 102 and 103 in one direction and back through the read apertures of devices 104 and 101 in the other direction. Thereupon, instead of being grounded as in FIG. 6, the address conductor goes to another core plane represented by Z′, where in row X1, it passes through the control apertures 102′ and 103′ in one direction and then back through the read apertures of devices 104′ and 101′ in the opposite direction prior to being grounded.

Similarly, along the Y coordinate in column Y1, a bipolar current driver 145 energizes address conductor RY1, CY1. Address conductor RY1, CY1 then passes through the read apertures of magnetic devices 103 and 104 in one direction and back through the control apertures of the same devices in the other direction. Thereupon, instead of being grounded as in FIG. 6, the address conductor goes to another core plane represented by Z′, where in column Y1, it passes through the apertures of devices 103′ and 104′ in one direction and then back through the control apertures of the same devices in the opposite direction prior to being grounded.

In the same manner, in column Y2, bipolar current driver 146 energizes address conductor RY2, CY2. Address conductor RY2, CY2 then passes through the read apertures of magnetic devices 101 and 102 in one direction and back through the control apertures of the same devices in the other direction. Thereupon, instead of being grounded as in FIG. 6, the address conductor goes to another core plane represented by Z′, where along column Y2, it passes through the apertures of devices 101′ and 102′ in one direction and then back through the control apertures of the same devices in the opposite direction prior to being grounded.

As in FIG. 6 and FIG. 8, if one row conductor and one column conductor are energized during the reading operation, only one magnetic device of plane Z is selected for reading and at the same time provided with the proper reverse magnetomotive force bias at the inner wall of its control aperture. The other magnetic devices of the same plane are not selected for either reading or controlling. However, because there are plural planes in FIG. 9, the corresponding magnetic device (same coordinates) in each plane is coincidentally addressed for a reading operation and a signal is produced in the sense winding (not shown) of that plane in accordance with the condition stored in the selected magnetic device.

In accordance with the descritpion of the operation of the device of FIG. 1, the half-address bipolar current pulses applied to the address conductors of FIGS. 6–11 during the reading operation will be in plus and minus polarity doublet form to assure that the current coincidentally selected magnetic device in each plane is left in a desired reference condition.

During the control operation of FIG. 9, a corresponding memory device in each plane will be coincidentally addressed. No other magnetic device in each plane will be coincidentally addressed so as to change the condition stored therein. As those skilled in the art will recognize, normal three-dimensional operation of core matrices utilize the inhibit winding shown so that the coincidentally addressed device of one or more of the planes does not change its stored condition as appropriate with respect to the information being written into the memory.

Thus, whether one or more core planes of two-apertured memory devices are being utilized in the memory array, only one current source (one common commoned address conductor) is required for each column and each row of the X–Y memory array coordinates. Moreover, since each common address conductor folds back on itself in close proximity, the transmission line characteristics of the address conductor are greatly improved and the speed of the current pulse that can be transmitted therealong is greatly increased. This will allow the teachings of the present invention to be applied to large memory arrays including many planes along a Z dimension.

The five-address conductor arrangement shown in FIG. 7 may also be utilized in a three-dimensional array in substantially the same manner as the four-address conductor arrangement of FIG. 7 was utilized. To illustrate this point, reference is made to FIG. 10. Where in plane Z, the magnetic devices of FIG. 7 are arranged in the same rows and columns. As in FIG. 9, no sense winding or inhibit winding is shown for the purpose of simplicity of illustration since by reference to FIG. 8 those skilled in the art could properly add these necessary windings. Only the last core plane Z′ is shown. In plane Z′, the same identification numerals are retained.

Referring to plane Z of row X2, bipolar current driver 147 is connected to energize address conductor RX2. Address conductor RX2 passes through the read apertures of devices 104 and 101 in one direction and then to the X2 row of the plane Z′ where it passes through the read apertures of devices 101′ and 104′ in the other direction prior to being grounded. It should be noted that all of the address conductors of the devices of Z′ plane are used in reverse from those of plane Z. Accordingly, in every other plane of the Z dimension, the address conductors are used in reverse.

Referring again to X2 row of the Z plane, bipolar current driver 148 is connected to energize address conductor CX2. Address conductor CX2 passes through the control apertures of devices 101 and 104 in one direction and then to the X2 row of the Z′ plane where it passes through the control apertures of devices 104′ and 101′ in the other direction prior to being grounded.

In plane Z, row X1, bipolar current driver 149 is connected to energize address conductor CX1. Address conductor CX1 passes through the control apertures of devices 103 and 102 in one direction and then to the X1 row of the Z plane where it passes through the control apertures of devices 102′ and 103′ in the other direction prior to being grounded.

Similarly in plane Z, row X1, bipolar current driver 150 is connected to energize address conductor RX1. Address conductor RX1 passes through the read apertures of devices 102 and 103 in one direction and then to the X1 row of the Z′ plane where it passes through the read apertures of devices 103′ and 102′ in the other direction prior to being grounded.

Accordingly, two current drivers are required for each row of the three-dimensional coincident current instrumentation for every three-address conductor embodiment of the present invention. The only saving in current driver requirements is along the Y coordinate where each column requires only one current driver. For example, referring to the Y1 column of the Z plane, current driver 151 is connected to energize address conductor RY1, CY1. Address conductor RY1, CY1 then passes through the read apertures of devices 103 and 104 in one direction and back through the control apertures of the same devices in the other direction. Instead of conductor RY1, CY1 being grounded as in FIG. 7, it passes on to the next column Y1 of Z' plane. Then it passes through the control apertures of devices 103' and 104' in one direction and back through the read apertures in the same devices in the other direction prior to being grounded.

In like manner, referring to the Y2 column of the Z plane, bipolar current driver 152 is connected to energize address conductor RY2, CY2. Address conductor RY2, CY2 then passes through the read apertures of devices 101 and 102 in one direction and back through the control apertures of he same devices in the other direction. Instead of conductor RY2, CY2 being grounded as in FIG. 7, it passes on to the next column Y2 of the Z' plane. Then it passes through the read apertures of devices 101' and 102' in one direction and back through the control apertures of the same device in the other direction prior to being grounded.

While the three-address conductor system arrangement of FIG. 7 and FIG. 10 does not save as many current address drivers as the two-address conductor arrangement of FIG. 6 and FIG. 9, there may be instances where that technique is more desirable.

For example, ferrite apertured memory plates are known in the prior art when the magnetic material around each aperture operates as a toroidal core (or single path) device. While FIGS. 6–10 have illustrated the two-address conductor and the three-address conductor techniques according to the teachings of the present invention as applied to plural two-apertured devices, it should be clear that the teachings of the present invention are equally applicable when these two-apertured devices are in fact plural-apertured pairs in one larger ferrite memory plate.

Specifically, since the improved transfluxor type device of FIG. 1 (as described in the above-identified co-pending application of the applicant) may also operate satisfactorily in an unbounded magnetic material, it may also be utilized in a larger ferrite memory plate environment. FIG. 11 illustrates two exemplary larger ferrite plates 181 and 182 containing plural-apertured pair elements with the active magnetizable material associated with each apertured pair during the blocked condition outlined in the general shape of a pulley. Only the apertured-pair elements of plate 181 are visible in FIG. 11. In accordance with the arrangement shown, it may be noted that when the apertured-pair elements are in their blocked condition, the pulley flux pattern is such that the magnetic flux lines of adjacent apertured-pairs are in opposite directions, the opposing directions of flux lines of the adjacent element results in what may be characterized as a flux barrier. This flux barrier leads to many advantages such as a very minimum of interaction between the magnetic characteristics of the elements formed by the apertured-pairs. When a large ferrite apertured plate is used in place of the individual elements, most of the well-known advantages of the ferrite apertured memory plates are available to the memory constructed utilizing the improved transfluxor type device of the applicant. By inspection of FIG. 11, note that the control aperture of one two-apertured element is not adjacent to the control aperture of the nearest other two-apertured elements. This unique aperture topography and the flux barrier referred to cooperate so as to provide a storage system containing multiple bits of non-destructive storage with no interference or cross-talk existing between the adjacent apertured elements. FIG. 11 is identical with FIG. 9 except that the planes are unitary ferrite apertured slabs. Identification numerals are utilized so as to make this similarity more clear.

The teachings of the present invention have been described with respect to arrays utilizing two-apertured magnetic devices of the transfluxor type. However, it should be clear to those skilled in the art that the present invention has applicability to arrays utilizing devices with more than two apertures providing the mechanical and electrical instrumentation requirements are the equivalent of the devices shown.

It is to be understood that the respective ranks of the coordinates illustrated and described herein are arbitrarily designated as rows and columns or as X and Y coordinates by way of explanation only but as is obvious to those skilled in the art these designations may be interchanged. Thus, while the invention has been particularly shown and described with reference to preferred embodiments thereof, it will be understood by those skilled in the art that the foregoing and other changes in form and details may be made therein without departing from the spirit and scope of the invention.

What is claimed is:

1. A magnetic memory comprising; a plurality of two-apertured unitary memory elements made of magnetizable material physically arranged according to rectangular coordinates in rows and columns; one aperture of said pair of each element acting as a read aperture; said other aperture of said pair of each element acting as a control aperture; plural row and column coordinate energizing conductor means; the read apertures in the same row having a common energizing means passing therethrough; the control apertures in the same row having a common energizing conductor means passing therethrough; the read and control apertures in the same column having a common energizing conductor means passing therethrough.

2. A magnetic memory comprising; a plurality of two-apertured unitary memory elements made of magnetizable material physically arranged according to rectangular coordinates in ranks of row and column types; one aperture of said pair of each element acting as a read aperture; said other aperture of said pair of each element acting as a control aperture; plural row and column rank coordinate energizing conductor means; the read apertures in the same rank of a predetermined one of the types having a common energizing conductor means passing therethrough; the control apertures in the same rank of said one type having a common energizing conductor means passing therethrough; the read and control apertures in the same rank of the other type having a common energizing conductor means passing therethrough; the common energizing conductor means passing through all the read apertures in one rank of said one type being commoned with the common energizing conductor means passing through all the control apertures of an adjacent rank of said one type.

3. A magnetic memory comprising; a plurality of two-apertured unitary memory elements made of magnetizable material physically arranged according to rectangular coordinates in ranks of row and column types; one aperture of said pair of each element acting as a read aperture; said other aperture of said pair of each element acting as a control aperture; plural row and column rank coordinate energizing conductor means; the read apertures in the same rank of a predetermined one of the types having a common energizing conductor means passing therethrough; the control apertures in the same rank of said one type having a common energizing conductor means passing therethrough; the read and control apertures in the same rank of the other type having a common energizing conductor means passing therethrough; the common energizing conductor means passing through all the read apertures in one rank of said one type being connected to the common energizing conductor means passing through all the control apertures of an adjacent rank of said one type; plural energizing sources each connected to a separate energizing conductor means.

4. A magnetic memory comprising; a plurality of two-apertured unitary memory elements made of magnetizable material physically arranged according to rectangular coordinates in rows and columns; one aperture of said pair of each element acting as a read aperture; said other aperture of said pair of each element acting as a control aperture; plural row and column coordinate energizing conductor means; the read apertures in the same row having a common energizing conductor means passing therethrough; the control apertures in the same row having a common energizing conductor means passing therethrough; the read and control apertures in the same column having a common energizing conductor means passing therethrough; plural energizing sources each connected to a separate energizing conductor means.

5. A storage array comprising; a plurality of unitary pairs of apertures in magnetic material; said apertured pairs located in one plane and physically arranged therein according to rectangular coordinates in ranks of row and column types; one aperture of each pair acting as a read aperture; said other aperture of said pair acting as a control aperture; plural row and column rank coordinate addressing conductor means; the read apertures in the same rank of a predetermined one of the types having a common addressing conductor means passing therethrough; the control apertures in the same rank of said one type having a common addressing conductor means passing therethrough; the read and control apertures in the same rank of the other type having a common addressing conductor means passing therethrough; the common addressing conductor means through all the read apertures in one rank of said one type being commoned with the common addressing conductor means passing through all the control apertures of an adjacent rank of said one type.

6. A storage array comprising; a plurality of unitary pairs of apertures in magnetic material; said apertured pairs located in one plane and physically arranged therein according to rectangular coordinates in rows and columns; one aperture of each pair acting as a read aperture; said other aperture of said pair acting as a control aperture; plural row and coordinate addressing conductor means; the read apertures in the same row having a common addressing conductor means passing therethrough; the control apertures in the same row having a common addressing conductor means passing therethrough; the read and control apertures in the same column having a common addressing conductor means passing therethrough.

7. An array comprising; a plurality of unitary multi-apertured memory elements made of magnetizable material physically arranged according to rectangular coordinates in rows and columns; at least one aperture of said multi-apertures of each element operating as a read aperture; at least one other aperture of said multi-apertures of each element operating as a control aperture; plural row and column coordinate addressing conductor means; the read apertures in the same row having a common addressing conductor means passing therethrough; the control apertures in the same row having a common addressing conductor means passing therethrough; the read and control apertures in the same column having a common addressing conductor means passing therethrough.

8. A magnetic memory comprising; a plurality of unitary multi-apertured memory elements made of magnetizable material physically arranged according to rectangular coordinates in ranks of row and column types; one aperture of said multi-apertures of each element operating as a read aperture; another of said apertures of said multi-apertures of each element operating as a control aperture; plural row and column rank coordinate addressing conductor means; the read apertures in the same rank of a predetermined one of the types having a common addressing conductor means passing therethrough; the control apertures in the same rank of said one type having a common addressing conductor means passing therethrough; the read and control apertures in the same rank of the other type having a common addressing conductor means passing therethrough.

9. A magnetic memory comprising; a plurality of two-apertured unitary memory elements made of magnetizable material physically arranged according to rectangular coordinates in ranks of row and column types; one aperture of said pair of each element acting as a read aperture; said other aperture of said pair of each element acting as a control aperture; plural row and column rank coordinate energizing conductor means; the read apertures in the same rank of a predetermined one of the types having a common energizing conductor means passing therethrough; the control apertures in the same rank of said one type having a common energizing conductor means passing therethrough; the read and control apertures in the same rank of the other type having a common energizing conductor means passing therethrough; the common energizing conductor means passing through all the read apertures in one rank of said one type being commoned with the common energizing conductor means passing through all the control apertures of an adjacent rank of said one type; each of said commoned energizing conductors associated with each row and column rank being connected with a single current source.

10. A magnetic memory comprising; a plurality of two-apertured unitary memory elements made of magnetizable material physically arranged according to rectangular coordinates in ranks of row and column types; one aperture of said pair of each element acting as a read aperture; said other aperture of said pair of each element acting as a control aperture; plural row and column rank coordinate energizing conductor means; the read apertures in the same rank of a predetermined one of the types having a common energizing conductor means passing therethrough; the control apertures in the same row rank of said one type having a common energizing conductor means passing therethrough; the read and control apertures in the same column rank of the other type having a common energizing conductor means passing therethrough; the common energizing conductor means passing through all the read apertures in one rank of said one type being commoned with the common energizing conductor means passing through all the control apertures of an adjacent rank of said one type; each of said commoned energizing conductors associated with each row and rank being connected with a single current source; a characteristic impedance being connected in parallel with each current source and a commoned energizing conductor along each row and column rank.

11. A magnetic memory device comprising; a plurality of two-apertured unitary memory elements made of magnetizable material physically arranged in ranks according to rectangular coordinates of the X and Y types, respectively; one aperture of said pair of each element acting as a read aperture; said other aperture of said pair of each element acting as a control aperture; coordinate energizing means passing through each of said apertures; the magnetizable material around said apertured pair representing one binary state when the remanent flux passing around said aperture does not also encircle said control aperture; the magnetizable material around said apertured pair representing the other binary condition when the remanent flux disposed about said read aperture also encircles said control aperture; plural X and Y coordinate energizing conductors associated with said plural memory elements for coincidentally reading and controlling the binary condition within a single element of said plural elements; all of the energizing conductors associated with memory elements having the same rank of a predetermined one of the types of coordinates being commoned and passing through the read and control aperture of each element in opposite directions; the energizing conductor passing through the read aperture of elements having a given rank of the other type of coordinates being commoned with the energizing conductor passing through the control aperture of elements having an adjacent rank of said other type of coordinates.

12. A magnetic memory device comprising; a plurality of two-apertured unitary memory elements made of magnetizable material physically arranged in ranks according to rectangular coordinates having X and Y types, respectively; one aperture of said pair of each element acting as a read aperture; said other aperture of said pair of each element acting as a control aperture; coordinate energizing means passing through each of said apertures; the magnetizable material around said apertured pair representing one binary state when the remanent flux passing around said aperture does not also encircle said control aperture; the magnetizable material around said apertured pair representing the other binary condition when the remanent flux disposed about said read aperture also encircles said control aperture; plural X and Y coordinate energizing conductors associated with said plural memory elements for coincidentally reading and controlling the binary condition within a single element of said plural elements; all of the energizing conductors associated with memory elements having the same rank of a predetermined one of the types of coordinates being commoned and passing through the read and control aperture of each element in opposite directions; each element arranged along a rank of the other type of coordinates having a single energizing conductor passing through each read aperture and a single conductor passing through each control aperture.

13. A magnetic memory comprising; a plurality of two-apertured unitary memory elements made of magnetic material, said elements physically arranged in plural planes with corresponding elements in the plural planes located according to corresponding rectangular coordinates in rows and columns; the read apertures in the same row having a common energizing conductor means passing therethrough; the control apertures in the same row having a common energizing conductor means passing therethrough; the read and control apertures in the same column having a common energizing conductor means passing therethrough.

14. A storage array comprising; a plurality of two-apertured unitary memory elements made of magnetic material; said elements physically arranged in plural planes with corresponding elements in the plural planes located according to corresponding rectangular coordinates in ranks of row and column types; one aperture of said pair of each elements acting as a read aperture; said other aperture of said pair of each element acting as a control aperture; plural row and column rank coordinate energizing conductor means; the read apertures in the same rank of a predetermined one of the types having a common energizing conductor means passing therethrough; the control apertures in the same rank of said one type having a common energizing conductor means passing therethrough; the read and control apertures in the same rank of the other type having a common energizing conductor means passing therethrough; the common energizing conductor means passing through all the read apertures in one rank of said one type being commoned with the common energizing conductor means passing through all the control apertures of an adjacent rank of said one type.

References Cited by the Examiner

UNITED STATES PATENTS

| | | | |
|---|---|---|---|
| 2,952,840 | 9/60 | Ridler | 340—174 |
| 2,988,732 | 6/61 | Vinal | 340—174 |
| 3,007,140 | 10/61 | Minnick et al. | 340—174 |
| 3,048,828 | 8/62 | Cataldo | 340—174 |

IRVING L. SRAGOW, *Primary Examiner.*

JOHN F. BURNS, *Examiner.*